(12) United States Patent
Breternitz et al.

(10) Patent No.: US 9,223,714 B2
(45) Date of Patent: Dec. 29, 2015

(54) INSTRUCTION BOUNDARY PREDICTION FOR VARIABLE LENGTH INSTRUCTION SET

(71) Applicant: Intel Corporation, Santa Clara, CA (US)

(72) Inventors: Mauricio Breternitz, Austin, TX (US); Youfeng Wu, Palo Alto, CA (US); Peter Sassone, Austin, TX (US); James Mason, Austin, TX (US); Aashish Phansalkar, Austin, TX (US); Balaji Vijayan, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 264 days.

(21) Appl. No.: 13/836,374

(22) Filed: Mar. 15, 2013

(65) Prior Publication Data

US 2014/0281246 A1    Sep. 18, 2014

(51) Int. Cl.
*G06F 9/30* (2006.01)
*G06F 12/08* (2006.01)
*G06F 9/38* (2006.01)

(52) U.S. Cl.
CPC ............. *G06F 12/0875* (2013.01); *G06F 9/30* (2013.01); *G06F 9/30152* (2013.01); *G06F 9/3802* (2013.01); *G06F 9/3816* (2013.01); *G06F 12/0886* (2013.01); *G06F 9/3822* (2013.01); *G06F 9/3842* (2013.01)

(58) Field of Classification Search
CPC . G06F 9/30149; G06F 9/3802; G06F 9/3822; G06F 9/3816; G06F 9/30047; G06F 9/3842; G06F 9/30152
See application file for complete search history.

(56) References Cited

U.S. PATENT DOCUMENTS

| 5,210,842 | A |   | 5/1993  | Sood |
|-----------|---|---|---------|------|
| 5,222,225 | A |   | 6/1993  | Groves |
| 5,488,728 | A |   | 1/1996  | Dreyer |
| 5,504,923 | A |   | 4/1996  | Ando |
| 5,644,742 | A |   | 7/1997  | Shen et al. |
| 5,651,124 | A |   | 7/1997  | Shen et al. |
| 5,655,115 | A |   | 8/1997  | Shen et al. |
| 5,659,721 | A |   | 8/1997  | Shen et al. |
| 5,724,422 | A |   | 3/1998  | Shang et al. |
| 5,881,260 | A |   | 3/1999  | Raje et al. |
| 5,978,899 | A | * | 11/1999 | Ginosar et al. ................ 712/210 |

(Continued)

OTHER PUBLICATIONS

Jih-Kwon Peir, Shih-Chang Lai, Shih-Lien Lu, "Bloom Filtering Cache Misses for Accurate Data Speculation and Prefetching", Jun. 2002.*

*Primary Examiner* — Cheng-Yuan Tseng
*Assistant Examiner* — Rocio Del Mar Perez-Velez
(74) *Attorney, Agent, or Firm* — Trop, Pruner & Hu, P.C.

(57) ABSTRACT

A system, processor, and method to predict with high accuracy and retain instruction boundaries for previously executed instructions in order to decode variable length instructions is disclosed. In at least one embodiment, a disclosed processor includes an instruction fetch unit, an instruction cache, a boundary byte predictor, and an instruction decoder. In some embodiments, the instruction fetch unit provides an instruction address and the instruction cache produces an instruction tag and instruction cache content corresponding to the instruction address. The instruction decoder, in some embodiments, includes boundary byte logic to determine an instruction boundary in the instruction cache content.

19 Claims, 8 Drawing Sheets

(56) References Cited

U.S. PATENT DOCUMENTS

| | | | |
|---|---|---|---|
| 6,032,250 A * | 2/2000 | Zaidi | 712/210 |
| 6,041,405 A * | 3/2000 | Green | 712/213 |
| 6,055,623 A | 4/2000 | Webb et al. | |
| 6,055,624 A | 4/2000 | Webb et al. | |
| 6,058,470 A | 5/2000 | Webb et al. | |
| 6,067,617 A | 5/2000 | Webb et al. | |
| 6,202,204 B1 | 3/2001 | Wu et al. | |
| 6,209,079 B1 | 3/2001 | Otani et al. | |
| 6,230,317 B1 | 5/2001 | Wu | |
| 6,308,257 B1 * | 10/2001 | Theogarajan et al. | 712/210 |
| 6,332,214 B1 | 12/2001 | Wu | |
| 6,453,405 B1 | 9/2002 | Hoyle et al. | |
| 6,571,385 B1 | 5/2003 | Muthukumar et al. | |
| 6,625,725 B1 | 9/2003 | Wu et al. | |
| 6,629,314 B1 | 9/2003 | Wu | |
| 6,668,372 B1 | 12/2003 | Wu | |
| 6,836,841 B1 | 12/2004 | Wu et al. | |
| 6,848,100 B1 | 1/2005 | Wu et al. | |
| 6,898,700 B2 | 5/2005 | Alexander, III et al. | |
| 6,959,435 B2 | 10/2005 | Ju et al. | |
| 6,964,043 B2 | 11/2005 | Wu et al. | |
| 7,032,217 B2 | 4/2006 | Wu | |
| 7,039,909 B2 | 5/2006 | Wu et al. | |
| 7,095,342 B1 | 8/2006 | Hum et al. | |
| 7,100,155 B1 | 8/2006 | Wu | |
| 7,120,749 B2 | 10/2006 | Rakvic et al. | |
| 7,149,878 B1 | 12/2006 | Jensen et al. | |
| 7,188,234 B2 | 3/2007 | Wu et al. | |
| 7,308,682 B2 | 12/2007 | Wu | |
| 7,383,543 B2 | 6/2008 | Wu et al. | |
| 7,428,731 B2 | 9/2008 | Wu et al. | |
| 7,430,574 B2 | 9/2008 | Breternitz, Jr. et al. | |
| 7,448,031 B2 | 11/2008 | Wu | |
| 7,451,121 B2 | 11/2008 | Wu et al. | |
| 7,467,377 B2 | 12/2008 | Wu et al. | |
| 7,506,217 B2 | 3/2009 | Borin et al. | |
| 7,509,480 B2 | 3/2009 | Jensen et al. | |
| 7,620,781 B2 | 11/2009 | Breternitz, Jr. et al. | |
| 7,694,281 B2 | 4/2010 | Wang et al. | |
| 7,703,088 B2 | 4/2010 | Li et al. | |
| 7,725,887 B2 | 5/2010 | Wu et al. | |
| 7,752,613 B2 | 7/2010 | Guo et al. | |
| 7,757,221 B2 | 7/2010 | Zheng et al. | |
| 7,802,136 B2 | 9/2010 | Wang et al. | |
| 7,818,744 B2 | 10/2010 | Wang et al. | |
| 7,840,953 B2 | 11/2010 | Wu et al. | |
| 7,844,946 B2 | 11/2010 | Wu et al. | |
| 7,865,885 B2 | 1/2011 | Wu et al. | |
| 7,937,620 B2 | 5/2011 | Wang et al. | |
| 7,937,621 B2 | 5/2011 | Wang et al. | |
| 8,001,421 B2 | 8/2011 | Wang et al. | |
| 8,005,885 B1 | 8/2011 | Wilt | |
| 8,060,482 B2 | 11/2011 | Wang et al. | |
| 8,099,587 B2 | 1/2012 | Wu et al. | |
| 8,132,158 B2 | 3/2012 | Wang et al. | |
| 8,146,106 B2 | 3/2012 | Kim et al. | |
| 8,156,480 B2 | 4/2012 | Wu et al. | |
| 8,296,749 B2 | 10/2012 | Zhao et al. | |
| 8,316,360 B2 | 11/2012 | So et al. | |
| 8,321,840 B2 | 11/2012 | Nagarajan et al. | |
| 8,332,558 B2 | 12/2012 | Porto et al. | |
| 2001/0018657 A1 | 8/2001 | Hatanaka | |
| 2001/0052065 A1 | 12/2001 | Alexander, III et al. | |
| 2002/0032558 A1 | 3/2002 | Strong et al. | |
| 2003/0151962 A1 | 8/2003 | Tomizawa et al. | |
| 2003/0236964 A1 * | 12/2003 | Madduri | 712/204 |
| 2005/0114631 A1 | 5/2005 | Liang | |
| 2006/0248279 A1 * | 11/2006 | Al-Sukhni et al. | 711/137 |
| 2007/0028078 A1 | 2/2007 | Harris et al. | |
| 2010/0017580 A1 | 1/2010 | Greenhalgh et al. | |
| 2010/0211761 A1 | 8/2010 | Dasgupta | |
| 2012/0072671 A1 * | 3/2012 | Chirca et al. | 711/136 |
| 2012/0089783 A1 * | 4/2012 | Tsirkin et al. | 711/125 |
| 2012/0144168 A1 * | 6/2012 | Butler et al. | 712/220 |
| 2013/0179484 A1 | 7/2013 | Moharil et al. | |

* cited by examiner

INSTRUCTION BOUNDARY PREDICTION FOR VARIABLE LENGTH INSTRUCTION SET

TECHNICAL FIELD

Embodiments described herein generally relate to processor architecture and, in particular, a processor employing variable length instructions.

BACKGROUND

Decoding variable length instructions is a challenge, especially when there is a need to process multiple instructions on a multi-issue microarchitecture. Current solutions for decoding variable length instructions include speculating an instruction boundary at each consecutive byte of the fetched line and searching for decoded instructions in parallel or utilizing error-correcting code memory bits of the cache to store information.

DESCRIPTION OF EMBODIMENTS

Figure 1A:
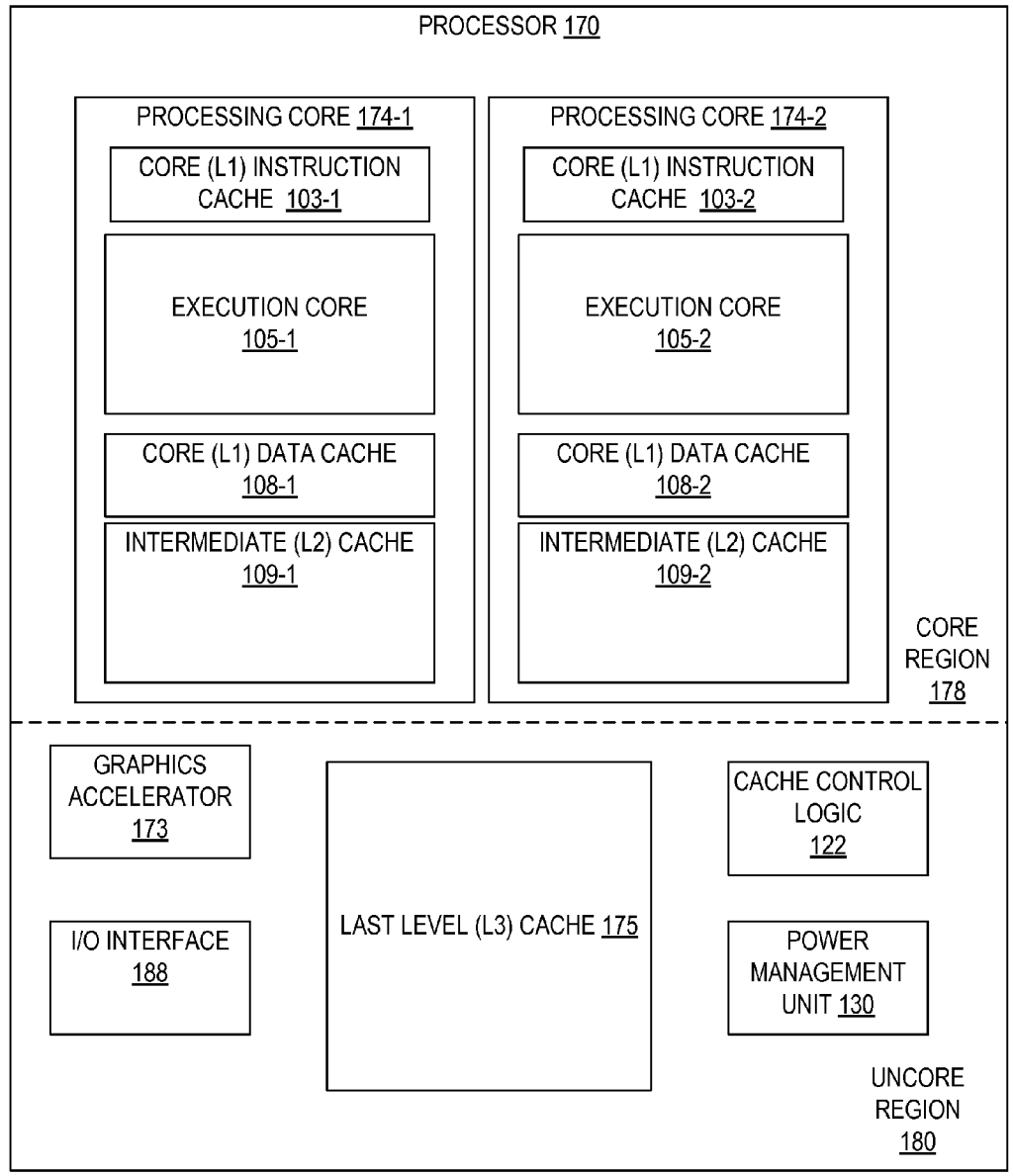
FIG. 1A illustrates a multi-core processor used in conjunction with at least one embodiment.

In at least one embodiment, a disclosed processor includes an instruction fetch unit, an instruction cache, a boundary byte predictor, and an instruction decoder. In some embodiments, the instruction fetch unit provides an instruction address and the instruction cache produces an instruction tag and instruction cache content corresponding to the instruction address. In at least one embodiment, the boundary byte predictor receives the instruction tag and generates a prediction vector including a bit corresponding to each byte in a group of instruction cache content bytes. The instruction decoder, in some embodiments, includes boundary byte logic to determine an instruction boundary in the instruction cache content. In at least one embodiment, the boundary byte logic forms an initial prediction of a boundary byte based on the prediction vector.

In some embodiments, the group of instruction cache content bytes includes each byte in content associated with the instruction tag. The group of instruction cache content bytes may, in some embodiments, include a subset of the content associated with the instruction tag. In at least one embodiment, the boundary byte predictor receives subset input indicative of the subset of instruction tag bytes. In some embodiments, the subset input is indicative of an instruction pointer value. In at least one embodiment, the boundary byte predictor includes an array of filters. In some embodiments, each filter produces a 1-bit value based on a hash of the instruction tag. In at least one embodiment, each filter in the array of filters generates multiple hashed outputs of the instruction tag and determines the 1-bit value based on the multiple hashed outputs.

In at least one embodiment, a disclosed computer system includes a processor, an I/O bridge to provide an interface for an I/O device, and a system memory, accessible to the processor. In some embodiments, the processor includes an instruction fetch unit to provide an instruction address and an instruction cache to produce an instruction tag and instruction cache content corresponding to the instruction address. In at least one embodiment, the processor includes a boundary byte predictor to receive the instruction tag and to generate a prediction vector including a bit corresponding to each byte in a group of instruction cache content bytes and an instruction decoder including boundary byte logic to determine an instruction boundary in the instruction cache content. In some embodiments, the boundary byte logic forms an initial prediction of a boundary byte based on the prediction vector. The processor includes, in some embodiments, a plurality of processing cores. In at least one embodiment, each of the processing cores includes a boundary byte predictor. In some embodiments, the group of instruction cache content bytes includes each byte in content associated with the instruction tag.

In some embodiments, the group of instruction cache content bytes includes a subset of content associated with the instruction tag. The boundary byte predictor may, in some embodiments, receive subset input indicative of the subset of instruction tag bytes. In some embodiments, the subset input is indicative of an instruction pointer value. In at least one embodiment, the boundary byte predictor includes an array of filters and each filter produces a 1-bit value based on a hash of the instruction tag. In some embodiments, each filter in the array of filters generates multiple hashed outputs of the instruction tag and determines the 1-bit value based on the multiple hashed outputs.

In at least one embodiment, a disclosed method of instruction decoding includes providing an instruction tag to a predictor comprising an array of filters, providing instruction cache content corresponding to the instruction address to an instruction decoder, and receiving a prediction vector including a bit corresponding to each byte in a group of instruction cache content bytes. In some embodiments, an instruction boundary in the instruction cache content is determined from an initial prediction of a boundary byte based on the prediction vector. The array of filters, in some embodiments, includes a predictor for each byte in the cache content. In at least one embodiment, subset bits to the predictor are provided. In some embodiments, the subset bits are indicative of a subset of the instruction cache content bytes. In some embodiments, the subset bits to the instruction decoder with the predictor vector are provided. In at least one embodiment, the subset bits based on an instruction pointer value are generated. The array of filters may, in some embodiments, include an array of bloom filters.

In the following description, details are set forth in conjunction with embodiments to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, widget 12-1 refers to an instance of a widget class, which may be referred to collectively as widgets 12 and any one of which may be referred to generically as a widget 12.

Figure 1B:
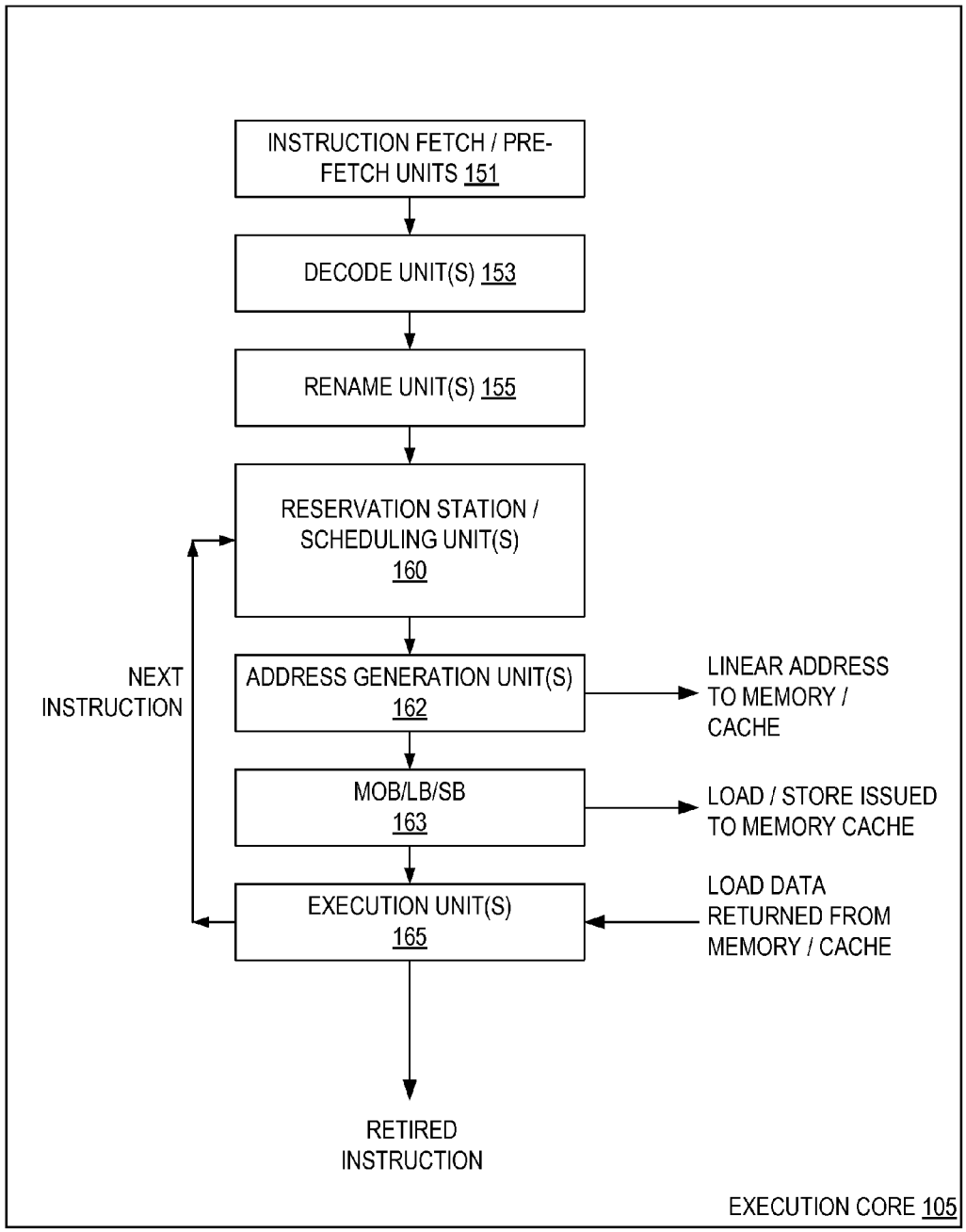
FIG. 1B illustrates an out-of-order execution core used in conjunction with at least one embodiment.

FIG. 1A illustrates a multi-core processor used in conjunction with at least one embodiment. In at least one embodiment, processor 170 includes a core region 178 and an integration region 180. In some embodiments, core region 178 includes processing cores 174-1 and 174-2. In at least one embodiment, each processing core 174 includes a core or level 1 (L1) instruction cache 103, an execution core 105, a core or L1 data cache 108, and an intermediate or level 2 (L2) cache 109. FIG. 1B illustrates an out-of-order execution core used in conjunction with at least one embodiment. Other embodiments include in-order processing cores or other alternative architectures.

In at least one embodiment, integration region 180 includes a last level (L3) cache (LLC) 175 and cache control logic 122. In some embodiments, LLC 175 is a shared resource for all of processing cores 174 of processor 170. In at least one embodiment, if a memory access instruction that is presented to LLC 175 generates a cache miss, the requested data must be retrieved from system memory.

In some embodiments, processing core 174 and/or integration region 180 may include one or more levels of a cache hierarchy between core caches 103, 108, intermediate cache 109, and LLC 175. In at least one embodiment, each of the cache memories of processing core 174 may have a unique architectural configuration. In at least one embodiment, core data cache 108, intermediate cache 109 and LLC 175 are multiple-way, set associative caches. In some embodiments, LLC 175 is inclusive with respect to intermediate cache 109 while, in other embodiments, LLC 175 may be exclusive or non-inclusive with respect to intermediate cache 109. Similarly, intermediate cache 109 may, in some embodiments, be either inclusive or non-inclusive with respect to core data cache 108, core instruction cache 103, or both.

In at least one embodiment, cache control logic 122 controls access to the cache memories, enforces a coherency policy, implements a replacement policy, and monitors memory access requests from external agents, e.g., other processors 170 or I/O devices. In at least one embodiment, LLC 175, intermediate cache 109, and core caches 103, 108 comply with the MESI protocol or a modified MESI protocol. The four states of the MESI protocol are illustrated in Table 1.

TABLE 1

Description of Cacheline States in the MESI Protocol

| MESI State | Description |
|---|---|
| Modified | The cache line contains valid data that is modified from the system memory copy of the data. Also referred to as a 'dirty' line. |
| Exclusive | The line contains valid data that is the same as the system memory copy of the data. Also indicates that no other cache has a line allocated to this same system memory address. Also referred to as a 'clean' line. |
| Shared | The line contains valid and clean data, but one or more other caches have a line allocated to this same system memory address. |
| Invalid | The line is not currently allocated and is available for storing a new entry. |

In some embodiments, the cache memories of processor 170 may implement a modified MESI protocol, which might include, in one embodiment, an "F" state identifying one of a plurality of "S" state lines, where the "F" state line is designated as the line to forward the applicable data should an additional request for the data be received, e.g., from a processor that does not have the data.

In at least one embodiment, integration region 180 of processor 170 also includes power management unit 130 to control power provided to the various resources of processor 170. In some embodiments, power management unit 130 provides unique power supply levels to core region 178 and integration region 180. In other embodiments, power management unit 130 may be further operable to provide unique power supply levels to each processing core 174 and/or provide clock signals at unique frequencies to processing cores 174. In addition, in some embodiments, power management unit 130 may implement various power states for processor 170 and define or respond to events that produce power state transitions.

In some embodiments, integration region 180 includes graphics accelerator 173 to support low latency, high bandwidth communication with a display device (not depicted). In other embodiments, graphics accelerator 173 may be implemented in an I/O hub or other chipset device.

In at least one embodiment, integration region 180 includes an I/O interface 188 to support communication with one or more chipset devices, discreet bus interfaces, and/or individual I/O devices. In some embodiments, I/O interface 188 provides one or more point-to-point interfaces. In other embodiments, I/O interface 188 may provide an interface to a shared bus to which one or more other processors 170 may also connect.

FIG. 1B illustrates an out-of-order execution core used in conjunction with at least one embodiment. Other embodiments include in-order execution cores or other alternative architectures. In at least one embodiment, pending loads may be speculatively issued to a memory address before other older pending store operations according to a prediction algorithm, such as a hashing function. In at least one embodiment, execution core 105 includes a fetch/prefetch unit 151, a decoder unit 153, one or more rename units 155 to assign registers to appropriate instructions or micro-ops, and one or more scheduling/reservation station units 160 to store micro-ops corresponding to load and store operations (e.g., STA micro-ops) until their corresponding target addresses source operands are determined. In some embodiments an address generation unit 162 to generate the target linear addresses corresponding to the load and stores, and an execution unit 165 to generate a pointer to the next operation to be dispatched from the scheduler/reservation stations 160 based on load data returned by dispatching load operations to memory/cache are also included. In at least one embodiment, a memory order buffer (MOB) 163, which may contain load and store buffers to store loads and stores in program order and to check for dependencies/conflicts between the loads and stores is included. In one embodiment, loads may be issued to memory/cache before older stores are issued to memory/cache without waiting to determine whether the loads are dependent upon or otherwise conflict with older pending stores.

Figure 2:
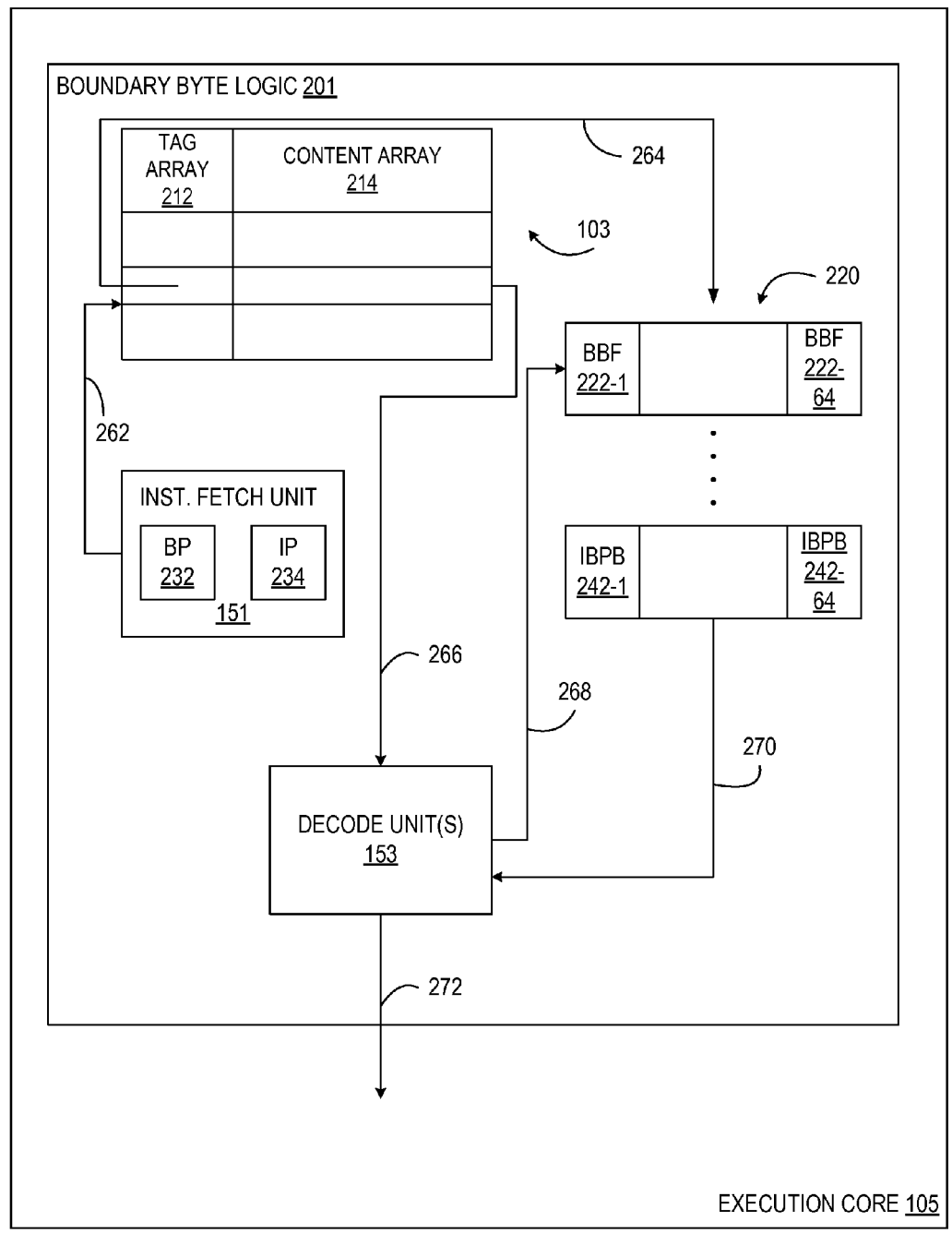
FIG. 2 illustrates boundary byte logic used in conjunction with at least one embodiment.

FIG. 2 illustrates boundary byte logic 201 in execution core engine 105 used in conjunction with at least one embodiment. In at least one embodiment, boundary byte logic 201 includes boundary byte prediction logic 220 to generate a prediction vector 270 indicative of a prediction of the first byte of an instruction. First byte prediction may be beneficially employed in an architecture that includes variable length instructions. When code that includes variable length instructions is stored in a cache memory, each cache line may include the first byte of one or more instructions, but the positions of those bytes may vary from cache line to cache line. Identifying the first byte is a necessary first step to instruction decoding.

In some embodiments, prediction logic 220 generates a prediction that includes one bit for each byte in the cache lines of core instruction cache 103. In some embodiments, instruction fetch unit(s) 151 includes a branch prediction unit 232 and an instruction point 234 and generates an instruction address 262. In at least one embodiment, instruction address 262 is provided to core instruction cache 103, which indexes a tag array 212 to identify an instruction cache entry that hits. In some embodiments, the instruction address 262 is illustrated pointing to its matching tag entry. In at least one embodiment, the tag 264 from the matching instruction cache entry is provided to prediction logic 220 while the content 266 of the applicable instruction cache entry is provided from instruction cache content array 214 to decoder unit(s) 153.

In at least one embodiment, prediction logic 220 includes an array of banked bloom filters 222. In at least one embodiment, each filter 222 generates a 1-bit output based on the instruction cache tag 264. In some embodiments, each filter bit 242 represents a binary prediction of whether a byte or other grain of the instruction cache content 266 provided to decode unit(s) 153 is the first byte of valid instruction. In at least one embodiment, the collection of all outputs of all filters 222, illustrated in FIG. 2 as prediction vector 270, is provided to decode unit(s) 153. In at least one embodiment, decode unit(s) 153 begins the process of decoding instruction cache content 266 by selecting a first byte to decode based on prediction vector 270. In some embodiments, if the prediction proves to be incorrect, feedback information 268 is provided to prediction logic 220. In at least one embodiment, bloom filters 222 drive saturating counters of 1, 2, or more bits. In some embodiments, when a saturating counter reaches a maximum value, subsequent increments do not affect the counter.

Figure 3:
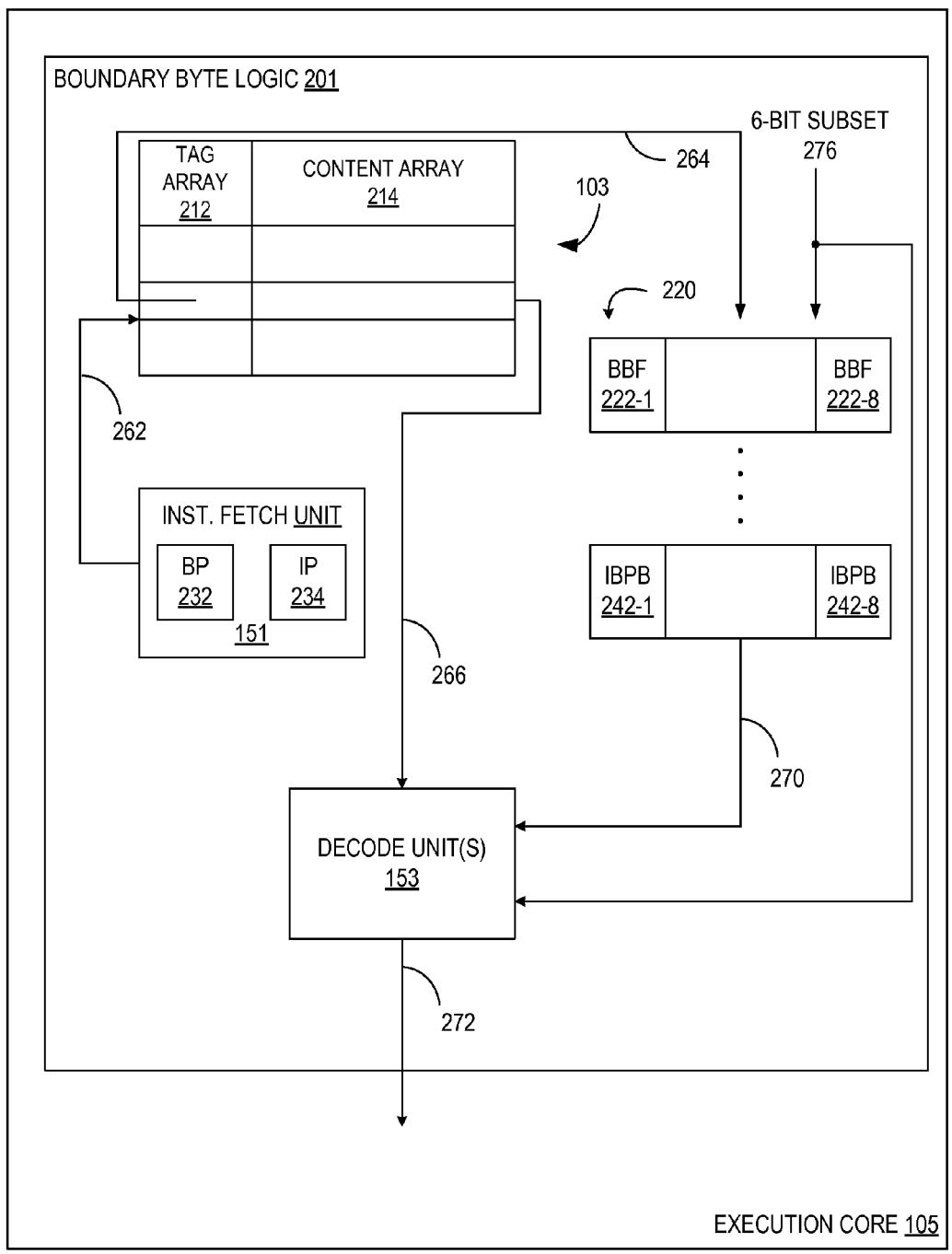
FIG. 3 illustrates boundary byte logic used in conjunction with at least one embodiment.

FIG. 3 illustrates boundary byte logic 201 in execution core 105 used in conjunction with at least one embodiment. In some embodiments, information in addition to the instruction cache tag is used as an input to the array of banked bloom predictors. In at least one embodiment, the additional information may be used to identify a subset of the instruction cache line. In some embodiments, the identified subset may then be processed with the banked bloom filters 222.

In at least one embodiment, prediction logic 220 receives, in addition to the instruction cache tag 264, 6-bits of additional information referred to as subset information. In some embodiments, the subset information indicates which block of 8-bytes within the cache line are passed through the banked bloom filters. In some embodiments, depending upon the embodiment of the processor employed and the instruction set architecture, it may be sufficient to focus the search for a first byte bit on a subset of the cache line. Although some embodiments provide information sufficient to identify an 8-byte subset of a 64-byte cache line, other embodiments may employ more or fewer bits to identify more or fewer subset bytes of cache lines that are larger or smaller than 64-bytes. In at least one embodiment, the inclusion of subset bits 276 enables the use of a prediction logic 222 that includes only 8 banked bloom predictors.

In some embodiments, subset bits 276 are also provided to prediction logic 220 and combine with the tag 264 to present each filter 222 with a concatenation of the tag 264 and the subset bits 276. In at least one embodiment, six subset bits 276 are included to provide an indication of which group of 8-byte segments will receive filter bits 242. In at least one embodiment, subset bits 276 may also be provided to decode unit(s) 153 to provide the decode unit with information enabling the decode unit to make use of the reduced-width prediction vector 270. In some embodiments, the subset bits 276 may be generated based on the last known value of the instruction pointer 234 or other information. In at least one embodiment, the prediction vector 270 may be provided to decoder unit(s) 153 and the decoded instruction 272 may be sent to the execution pipeline.

Figure 4:
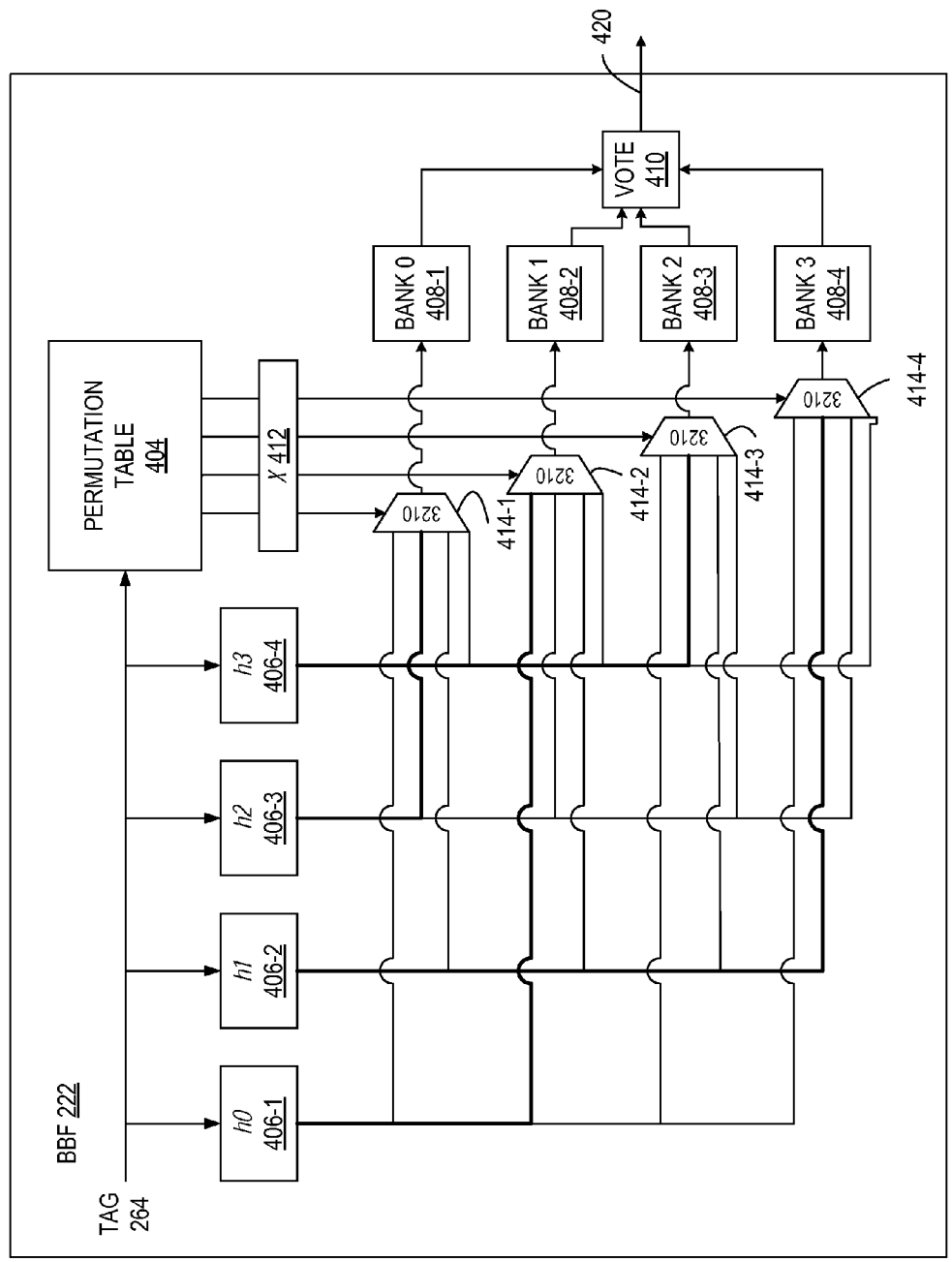
FIG. 4 illustrates a banked bloom filter predictor used in conjunction with at least one embodiment.

FIG. 4 illustrates a banked bloom filter predictor used in conjunction with at least one embodiment. In at least one embodiment, a bloom filter represents a binary prediction algorithm that employs a hash of an instruction tag 264 to select one counter from the table, and the most significant bit of the counter provides the final prediction. In some embodiments, bloom filter 222 uses four hashing algorithms and includes a combining function that converts the multiple predictions into the bloom filter's final prediction 420 based on majority or unanimous voting. In at least one embodiment, the bloom filters are banked to guarantee conflict-free hashes through the use of a hard-wired permutation table 404. In some embodiments, banked bloom filter 222 is organized with four banks 408-1, 408-2, 408-3 and 408-4 and four hash functions 406-1, 406-2, 406-3 and 406-4. In at least one embodiment, tag entry 264 information is used by each hash function 406-1, 406-2, 406-3 and 406-4 as well as the permutation table 404. In at least one embodiment, permutation table 404 ensures conflict-free hashes by generating a permutation vector x 412 to indicate which combination of hash functions is selected. In at least one embodiment, permutation x 412 outputs are used by multiplexors 414-1, 414-2, 414-3 and 414-4 to select which hash function will be sent to the corresponding bank. In some embodiments, the hash mapping in a banked bloom filter ensures that bank conflicts cannot occur and allows freedom to choose any hash function based on permutation x 412. In at least one embodiment, permutation table 404 lookup may be performed in parallel with the hash function computations. In some embodiments, once the hash functions have been selected by the banks, a combining function vote 410 converts the multiple predictions into the banked bloom filters final prediction 420.

Figure 5:
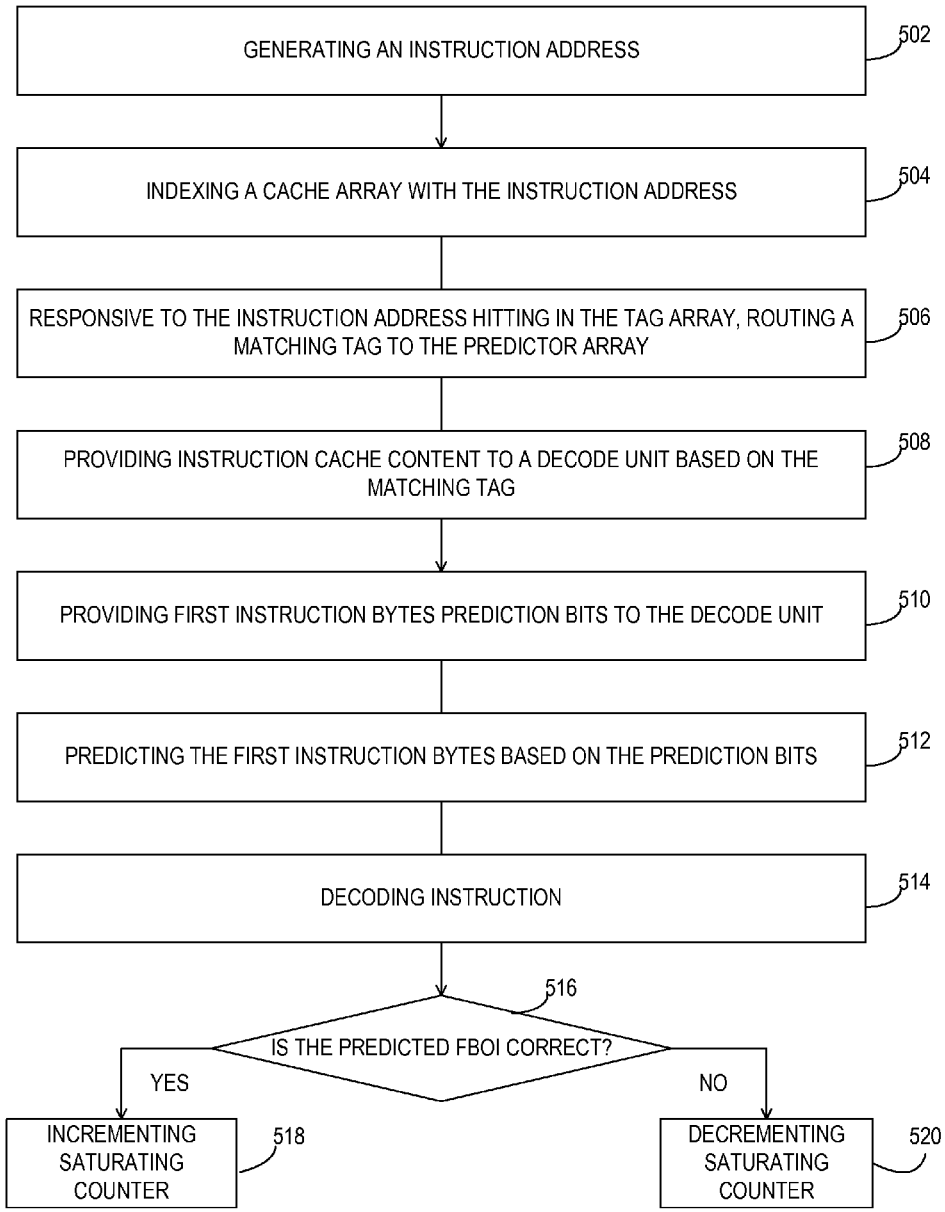
FIG. 5 illustrates one embodiment of a method of retaining instruction boundaries for previously executed instructions in order to decode an instruction.

FIG. 5 illustrates one embodiment of a method of retaining instruction boundaries for previously executed instructions in order to decode an instruction. In at least one embodiment, method 500 begins with generating an instruction address in block 502. In some embodiments, a cache array is indexed with the instruction address that was generated (block 504) and a matching tag is routed to the predictor array in response to the instruction address hitting in the tag array (block 506). In some embodiments, the instruction cache content corresponding to the matching tag is provided to a decode unit (block 508) and first instruction bytes prediction bits are provided to the decode unit (block 510). In at least one embodiment, a prediction bit is indicative of a prediction of whether a segment of the instruction cache content is a first byte of instruction and based on the prediction bits, the first instruction bytes are predicted (block 512) and the decode unit performs decoding of the instruction starting with the predicted first byte (block 514).

In at least one embodiment, a determination is made if the predicted first byte of instruction is correct in block 516. In some embodiments, if the predicted first byte of instruction is correct, the saturating counter is incremented (block 518). In some embodiments, if the predicted first byte of instruction is incorrect, the saturating counter is decremented (block 520).

Figure 6:
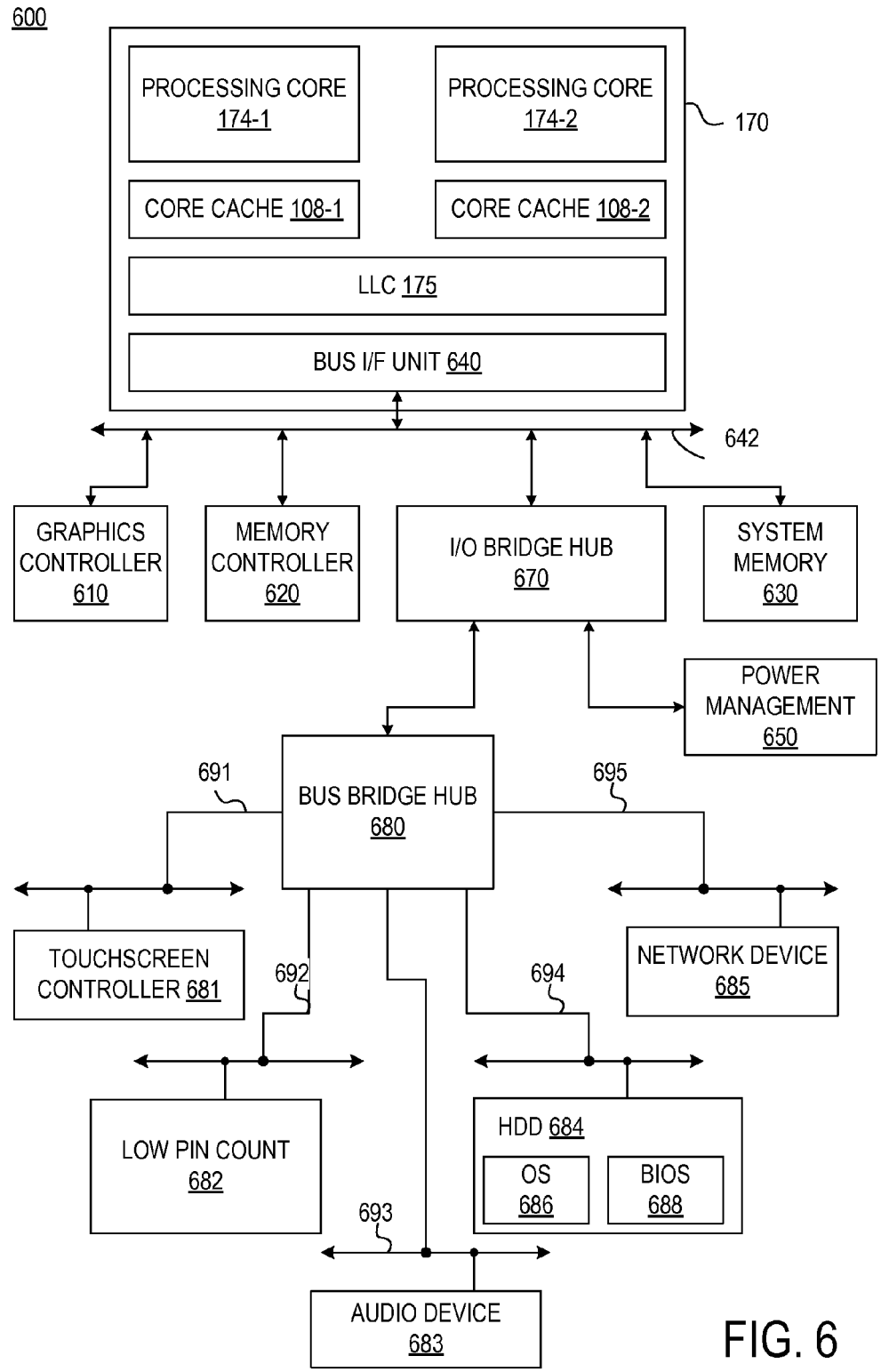
FIG. 6 illustrates a multiprocessor system used in conjunction with at least one embodiment.

Embodiments may be implemented in many different system types and platforms. FIG. 6 illustrates a shared-bus multiprocessor system used in conjunction with at least one embodiment. Other embodiments may include point-to-point bus systems. In at least one embodiment, system 600 is a multi-core processor system that includes a first processing core 174-1 and a second processing core 174-2. In some embodiments, processing cores 174 may include more or fewer processor cores.

In at least one embodiment, processing cores 174 may each include hardware and firmware resources (not depicted) to support an execution pipeline. In some embodiments, these resources may include a cache memory hierarchy, which may include a dedicated L1 instruction cache, a dedicated L1 data cache, an L2 data/instruction cache, or a combination thereof, pre-fetch logic and buffers, branch prediction logic, decode logic, a register file, various parallel execution resources including arithmetic logic units, floating point units, load/store units, address generation units, a data cache, and so forth. In at least one embodiment, core cache 108 and LLC 175 make up the cache memory hierarchy.

In some embodiments, bus interface unit 640 supports bidirectional transfer of data between processing cores 174 and a system memory 630, graphics controller 610, memory controller 620 and I/O bridge hub 670 via bus 642. In at least one embodiment, system memory 630 may be a double-data rate (DDR) type dynamic random-access memory (DRAM) while bus interface unit 640 may comply with a DDR interface specification. In some embodiments, system memory 630 may represent a bank of memory interfaces (or slots) that may be populated with corresponding memory circuits for a desired DRAM capacity.

In at least one embodiment, I/O bridge hub 670 includes bidirectional communication with power management controller 650 and bus bridge hub 680. In some embodiments, bus bridge hub 680 supports various bus protocols for different types of I/O devices or peripheral devices. In at least one embodiment, bus bridge hub 680 supports a network device 685 that implements a packet-switched network communication protocol (e.g., Gigabit Ethernet) via bus 695 (e.g., I2C, Industry Standard Architecture (ISA)), to support legacy interfaces that might include interfaces for a keyboard, mouse, serial port, parallel port, and a removable media drive and may further include an interface for a nonvolatile memory (NVM) device such as flash read only memory (ROM). In some embodiments, low bandwidth bus 691 is included that may support other low bandwidth I/O devices (e.g., keyboard, mouse) and touchscreen controller 681, bus 692 to support low pin count device 682, and bus 693 to support audio device 683. In some embodiments, storage protocol bus 694 (e.g., serial AT attachment (SATA), small computer system interface (SCSI)) supports persistent storage devices including conventional magnetic core hard disk drive (HDD) 684. In at least one embodiment, HDD 684 includes operating system 686, which may represent processor executable instructions including operating system instructions, application program instructions, and so forth, that, when executed by the processor, cause the processor to perform operations described herein, and basic input/output system 688, which may be utilized to initialize and test the system hardware components, as well as load an operating system or other program from a mass memory device.

Figure 7:
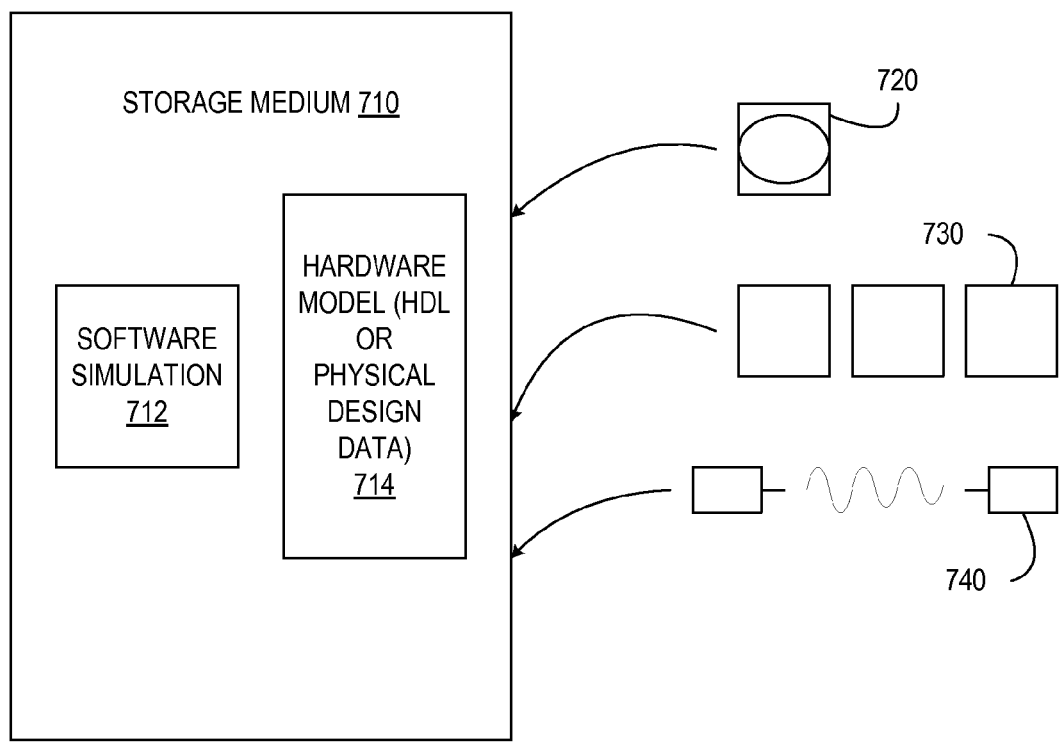
FIG. 7 illustrates a representation for simulation, emulation and fabrication of a design implementing the disclosed techniques.

FIG. 7 illustrates a representation for simulation, emulation and fabrication of a design implementing the disclosed techniques. Data representing a design may represent the design in a number of manners. First, as is useful in simulations, the hardware may be represented using a hardware description language or another functional description language which basically provides a computerized model of how the designed hardware is expected to perform. In at least one embodiment, hardware model 714 may be stored in a storage medium 710 such as a computer memory so that the model may be simulated using simulation software 712 that applies a particular test suite to the hardware model 714 to determine if it indeed functions as intended. In some embodiments, the simulation software 712 is not recorded, captured or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a tangible machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a tangible machine readable medium. In at least one embodiment, an optical or electrical wave 740 modulated or otherwise generated to transmit such information, a memory 730, or a magnetic or optical storage 720 such as a disc may be the tangible machine readable medium. In some embodiments, any of these mediums may "carry" the design information. The term "carry" (e.g., a tangible machine readable medium carrying information) thus covers information stored on a storage device or information encoded or modulated into or on to a carrier wave. The set of bits describing the design or the particular part of the design are (when embodied in a machine readable medium such as a carrier or storage medium) an article that may be sold in and of itself or used by others for further design or fabrication.

The following pertain to further embodiments.

Embodiment 1 is a processor including: (i) an instruction fetch unit to provide an instruction address; (ii) an instruction cache to produce an instruction tag and instruction cache content corresponding to the instruction address; (iii) a boundary byte predictor to receive the instruction tag and generate a prediction vector including a bit corresponding to each byte in a group of instruction cache content bytes; and (iv) an instruction decoder including boundary byte logic to determine an instruction boundary in the instruction cache content, wherein the boundary byte logic forms an initial prediction of a boundary byte based on the prediction vector.

In embodiment 2, the group of instruction cache content bytes included in the subject matter of embodiment 1 can optionally include each byte in content associated with the instruction tag.

In embodiment 3, the group of instruction cache content bytes included in the subject matter of embodiment 1 can optionally include a subset of the content associated with the instruction tag.

In embodiment 4, the boundary byte predictor included in the subject matter of embodiment 3 can optionally receive subset input indicative of the subset of instruction tag bytes.

In embodiment 5, the subset input included in the subject matter of embodiment 4 is optionally indicative of an instruction pointer value.

In embodiment 6, the boundary byte predictor included in the subject matter of embodiment 1 can optionally include an array of filters and each filter included in the subject matter of embodiment 1 can optionally produce a 1-bit value based on a hash of the instruction tag.

In embodiment 7, each filter in the array of filters included in the subject matter of embodiment 6 can optionally generate multiple hashed outputs of the instruction tag and determines the 1-bit value based on the multiple hashed outputs.

Embodiment 8 is a computer system including: (i) a processor, the processor including: an instruction fetch unit to provide an instruction address; an instruction cache to produce an instruction tag and instruction cache content corresponding to the instruction address; a boundary byte predictor to receive the instruction tag and generate a prediction vector including a bit corresponding to each byte in a group of instruction cache content bytes; and an instruction decoder including boundary byte logic to determine an instruction boundary in the instruction cache content, wherein the boundary byte logic forms an initial prediction of a boundary byte based on the prediction vector; (ii) an I/O bridge to provide an interface for an I/O device; and (iii) a system memory, accessible to the processor.

In embodiment 9, each the processor included in the subject matter of embodiment 8 can optionally include a plurality of processing cores, and further wherein each of the processing cores includes a boundary byte predictor.

In embodiment 10, the group of instruction cache content bytes included in the subject matter of embodiment 8 can optionally include each byte in content associated with the instruction tag.

In embodiment 11, the group of instruction cache content bytes included in the subject matter of embodiment 8 can optionally include a subset of content associated with the instruction tag.

In embodiment 12, the boundary byte predictor included in the subject matter of embodiment 11 can optionally receive subset input indicative of the subset of instruction tag bytes.

In embodiment 13, the subset input included in the subject matter of embodiment 12 is optionally indicative of an instruction pointer value.

In embodiment 14, the boundary byte predictor included in the subject matter of embodiment 8 can optionally include an array of filters and each filter included in the subject matter of embodiment 8 can optionally produce a 1-bit value based on a hash of the instruction tag.

In embodiment 15, each filter in the array of filters included in the subject matter of embodiment 14 can optionally generate multiple hashed outputs of the instruction tag and determine the 1-bit value based on the multiple hashed outputs.

Embodiment 16 is an instruction decoding method including: (i) providing an instruction tag to a predictor including an array of filters; (ii) providing instruction cache content corresponding to the instruction address to an instruction decoder; (iii) receiving a prediction vector including a bit corresponding to each byte in a group of instruction cache content bytes; and (iv) determining, from an initial prediction of a boundary byte based on the prediction vector, an instruction boundary in the instruction cache content.

In embodiment 17, the array of filters included in the subject matter of embodiment 16 can optionally include a predictor for each byte in the cache content.

In embodiment 18, the subject matter of embodiment 17 can optionally include providing subset bits to the predictor the subset bits included in the subject matter of embodiment 17 can optionally be indicative of a subset of the instruction cache content bytes.

In embodiment 19, the subject matter of embodiment 18 can optionally include providing the subset bits to the instruction decoder with the predictor vector.

In embodiment 20, the subject matter of embodiment 18 can optionally include generating the subset bits based on an instruction pointer value.

In embodiment 21, the array of filters included in the subject matter of embodiment 16 can optionally include an array of bloom filters.

In embodiment 22, the boundary byte predictor included in the subject matter of any one of embodiments 1-5 can optionally include an array of filters.

In embodiment 23, the boundary byte predictor included in the subject matter of any one of embodiments 8-13 can optionally include an array of filters and each filter can optionally produce a 1-bit value based on a hash of the instruction tag.

In embodiment 24, the array of filters included in the subject matter of any one of embodiments 16-20 can optionally include an array of bloom filters.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor, comprising:
   an instruction fetch unit to provide an instruction address;
   an instruction cache to produce an instruction tag and instruction cache content corresponding to the instruction address;
   a boundary byte predictor to receive the instruction tag and generate a prediction vector to indicate a prediction of a first byte of an instruction, the prediction vector including a bit corresponding to each byte in a group of instruction cache content bytes, wherein the boundary byte predictor includes an array of filters, and further wherein each filter is to produce a bit value based on a hash of the instruction tag; and
   an instruction decoder including boundary byte logic to determine an instruction boundary in the instruction cache content, wherein the boundary byte logic is to form an initial prediction of the first byte of the instruction based on the prediction vector, and to decode the instruction beginning with the predicted first byte of the instruction.

2. The processor of claim 1, wherein the group of instruction cache content bytes includes each byte in the content associated with the instruction tag.

3. The processor of claim 1, wherein the group of instruction cache content bytes includes a subset of the content associated with the instruction tag.

4. The processor of claim 3, wherein the boundary byte predictor is to receive a subset input indicative of the subset of the content.

5. The processor of claim 4, wherein the subset input is indicative of an instruction pointer value.

6. The processor of claim 1, wherein each filter in the array of filters is to generate multiple hashed outputs of the instruction tag and determine the bit value based on the multiple hashed outputs.

7. A computer system, comprising:
   a processor, the processor comprising:
   an instruction fetch unit to provide an instruction address;

an instruction cache to produce an instruction tag and instruction cache content corresponding to the instruction address;

a boundary byte predictor to receive the instruction tag and generate a prediction vector including a bit corresponding to each byte in a group of instruction cache content bytes, the prediction vector to indicate a prediction of a first byte of an instruction, wherein the boundary byte predictor includes an array of filters, and further wherein each filter is to produce a bit value based on a hash of the instruction tag; and an instruction decoder including boundary byte logic to determine an instruction boundary in the instruction cache content, wherein the boundary byte logic is to form an initial prediction of a boundary byte of the instruction based on the prediction vector and the instruction decoder is to decode the instruction based on the initial prediction;

an I/O bridge to provide an interface for an I/O device; and a system memory, accessible to the processor.

8. The system of claim 7, wherein the processor includes a plurality of processing cores, and further wherein each of the plurality of processing cores includes a boundary byte predictor.

9. The system of claim 7, wherein the group of instruction cache content bytes includes each byte in the content associated with the instruction tag.

10. The system of claim 7, wherein the group of instruction cache content bytes includes a subset of the content associated with the instruction tag.

11. The system of claim 10, wherein the boundary byte predictor is to receive a subset input indicative of the subset of content.

12. The system of claim 11, wherein the subset input is indicative of an instruction pointer value.

13. The system of claim 7, wherein each filter in the array of filters is to generate multiple hashed outputs of the instruction tag and determine the bit value based on the multiple hashed outputs.

14. A method, comprising:
providing an instruction tag to a predictor comprising an array of filters, wherein each filter is to produce a bit value based on a hash of the instruction tag;

providing instruction cache content corresponding to the instruction address to an instruction decoder;

receiving a prediction vector including a bit corresponding to each byte in a group of instruction cache content bytes;

determining, from an initial prediction of a boundary byte based on the prediction vector, an instruction boundary in the instruction cache content; and decoding an instruction in the instruction cache content beginning at the determined instruction boundary.

15. The method of claim 14, wherein the array of filters includes a predictor for each byte in the cache content.

16. The method of claim 15, further comprising: providing subset bits to the predictor, wherein the subset bits are indicative of a subset of the instruction cache content bytes.

17. The method of claim 16, further comprising: providing the subset bits to the instruction decoder with the predictor vector.

18. The method of claim 16, further comprising: generating the subset bits based on an instruction pointer value.

19. The method of claim 14, wherein the array of filters comprises an array of bloom filters.

* * * * *